(12) United States Patent
Lee et al.

(10) Patent No.: US 9,290,223 B2
(45) Date of Patent: Mar. 22, 2016

(54) BIKE LIGHT MOUNTING SYSTEM

(71) Applicant: Specialized Bicycle Components, Inc., Morgan Hill, CA (US)

(72) Inventors: Brian Eric Lee, Corral de Tierra, CA (US); Andreas Absalon Volk, Morgan Hill, CA (US); Ian Hamilton, San Jose, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 14/186,941

(22) Filed: Feb. 21, 2014

(65) Prior Publication Data

US 2015/0239518 A1 Aug. 27, 2015

(51) Int. Cl.
*B62J 6/02* (2006.01)

(52) U.S. Cl.
CPC .............. *B62J 6/02* (2013.01); *Y10T 29/49826* (2015.01)

(58) Field of Classification Search
CPC ................................... B62J 6/02; F21L 15/14
USPC ........................................................ 280/288.4
See application file for complete search history.

(56) References Cited

U.S. PATENT DOCUMENTS

| 1,471,985 | A | * | 10/1923 | Tower ...................... 248/229.23 |
| 5,181,774 | A | | 1/1993 | Lane |
| 5,413,007 | A | * | 5/1995 | Vernon ......................... 73/866.3 |
| 5,477,425 | A | * | 12/1995 | Sun et al. ....................... 362/476 |
| 5,624,064 | A | | 4/1997 | McGee, Jr. |
| 5,921,669 | A | | 7/1999 | Taylor et al. |
| 6,012,827 | A | * | 1/2000 | Caplan et al. ................. 362/396 |
| 6,227,688 | B1 | * | 5/2001 | Taylor et al. .................. 362/473 |
| 6,264,351 | B1 | | 7/2001 | Taylor et al. |
| 6,568,838 | B2 | * | 5/2003 | Taylor et al. .................. 362/474 |
| 7,293,900 | B1 | * | 11/2007 | Lee ................................ 362/476 |
| 7,347,596 | B2 | * | 3/2008 | Ishikawa ....................... 362/473 |
| D592,340 | S | * | 5/2009 | Liao et al. ...................... D26/60 |
| D595,884 | S | * | 7/2009 | Liao et al. ...................... D26/60 |
| 7,780,321 | B1 | * | 8/2010 | Retief ............................ 362/474 |
| 8,132,700 | B2 | | 3/2012 | Dacko |
| 8,226,281 | B2 | * | 7/2012 | Wei ............................... 362/430 |
| 8,387,939 | B2 | | 3/2013 | Ford |

(Continued)

FOREIGN PATENT DOCUMENTS

| CN | 201309533 | 9/2009 |
| DE | 20217515 | 1/2003 |
| JP | 09118281 | 5/1997 |

(Continued)

*Primary Examiner* — Joseph Rocca
*Assistant Examiner* — Michael Stabley
(74) *Attorney, Agent, or Firm* — Michael Best & Friedrich LLP

(57) ABSTRACT

A bicycle and light assembly has wheels, a frame support by the wheels, a bike light supported by the frame, and a mounting system coupling the bike light to the frame. The mounting system includes a socket secured to one of the frame and the bike light, a post secured to the other of the frame and the bike light, and a releasable securing mechanism that secures the post in the socket. The mounting system can further include a mounting bracket coupling the post to the frame, wherein the mounting bracket facilitates rotational adjustment of the post about the post axis. The releasable securing mechanism can include a detent member positioned in a side opening of the socket and in engagement with a recess in the socket to secure the rotational orientation of the post in the socket.

13 Claims, 7 Drawing Sheets

(56) References Cited

U.S. PATENT DOCUMENTS

| | | | |
|---|---|---|---|
| 8,770,808 B1 * | 7/2014 | Campbell et al. | 362/473 |
| 2006/0061991 A1 | 3/2006 | Yeh | |
| 2009/0135619 A1 * | 5/2009 | Hung | 362/474 |
| 2011/0116278 A1 | 5/2011 | Lin | |
| 2011/0141751 A1 * | 6/2011 | Wei | 362/428 |

FOREIGN PATENT DOCUMENTS

| | | |
|---|---|---|
| JP | 2007022253 | 2/2007 |
| KR | 100750509 | 8/2007 |

* cited by examiner

BIKE LIGHT MOUNTING SYSTEM

BACKGROUND

The present invention relates generally to bike lighting systems, and particularly to a mounting system for such lights.

The first high performance bicycle headlight systems utilized rechargeable nickel-cadmium batteries. In order to generate adequate light output for off-road cycling after dark with sufficient run times, it was necessary to mount large battery packs to the bicycle frame. A cord connected the battery pack to a handlebar-mounted lighthead assembly that used halogen, and later high-intensity discharge (HID), bulbs. With the emergence of powerful and efficient light emitting diode (LEDs), along with the significantly greater energy density of lithium ion batteries, it became possible to produce high powered bicycle headlights with integrated batteries. The unitary configuration reduced production cost and improved mounting by eliminating the separate packaging and cords required, and outputs and run times increased due to a steady improvement in LED and lithium ion battery technologies.

Despite the cutting-edge technologies, bicycle headlights now mimic a familiar unitary light: the hand-held flashlight torch. Cylindrical batteries are mounted in a longitudinal (fore/aft) orientation behind a round reflector and lens. With integral batteries, the mass of the lightheads has increased several-fold, but the mounting systems remain largely the same as before. Installation and removal (required to recharge the batteries) is difficult, as is keeping the light from rotating around the handlebar. Lights are usually off-center, and the rider's cockpit becomes cramped.

SUMMARY

The present invention provides a bicycle and light assembly comprising front and rear wheels, a frame support by the front and rear wheels, a bike light supported by the frame, and a mounting system coupling the bike light to the frame. The mounting system includes a socket (defining a socket axis) secured to one of the frame and the bike light, a post secured to the other of the frame and the bike light (the post being configured to be inserted into the socket along the socket axis), and a releasable securing mechanism that secures the post in the socket.

In one embodiment, the mounting system further includes a mounting bracket coupling the post to the frame, and wherein the mounting bracket facilitates rotational adjustment of the post about the post axis, which is preferably substantially horizontal. In another embodiment, the post has a hollow interior and includes a side opening in a side wall of the post, and the releasable securing mechanism includes a detent member positioned in the side opening and in engagement with the socket. For example, the socket can include a recess that receives the detent member and secures the rotational orientation of the post in the socket. The socket can also include an additional recess that is positioned to receive the detent member when the bike light is in a different orientations relative to the frame.

The above-described assembly can be used in a method of mounting and adjusting a position of a bike light on a bicycle having handlebars. The method comprises attaching a mounting system to the handlebars, mounting the bike light on the mounting system with the bike light in front of the handlebars and the light projection axis facing substantially forward to achieve a first position of the bike light, rotating the mounting system relative to the handlebars until the bike light is substantially below the handlebars, and pivoting the bike light relative to the mounting system such that the light projection axis faces substantially forward to achieve a second position of the bike light. For example, the mounting system can include a mounting bracket, in which case the step of rotating can include loosening engagement between the mounting bracket and the handlebars to allow the mounting bracket to rotate relative to the handlebars. The mounting system can also include a releasable securing mechanism, in which case the step of pivoting the bike light can include releasing the securing mechanism (e.g., moving an actuating member) to allow the bike light to pivot relative to the mounting system.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
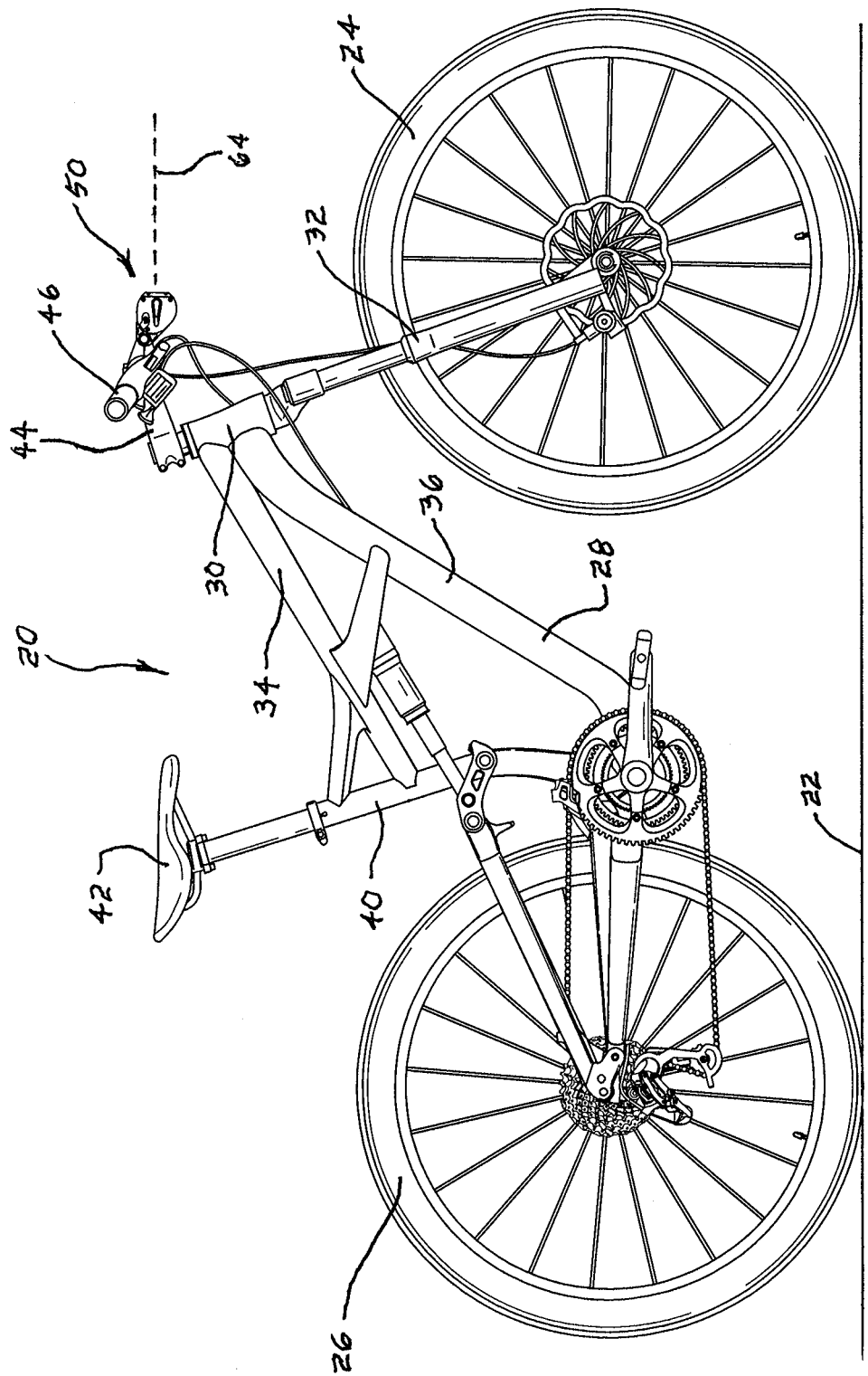
FIG. 1 is a side view of a bicycle having a lighting system embodying the present invention.

FIG. 1 illustrates a bicycle 20 designed to be ridden on the ground 22 and including a front wheel 24, a rear wheel 26, and a frame 28. The frame 28 includes a head tube 30, a front fork 32 rotationally supported by the head tube 30, a top tube 34 connected to and extending rearward from the head tube 30, and a down tube 36 connected to the head tube 30 below the top tube 34 and extending generally downward toward a bottom bracket of the frame 28. A seat tube 40 extends upward from the bottom bracket 38 and is connected to the top tube 34, and a seat 42 is supported by the seat tube 40. The bicycle 20 also includes a handlebar stem 44 and handlebars 46 for turning the front wheel via the fork 32.

An accessory in the form of a bike light 50 is supported by the handlebars 46 via a mounting system 52. The bike light 50 includes a housing 54, a light source 56 (e.g., an incandescent bulb or LED), batteries 58 for providing power to the light source 56, a curved reflector 60, and a front lens 62. The illustrated bike light 50 is configured to direct light in the direction of a light projection axis 64. Because the illustrated bike light 50 is a front light, the light is directed primarily in a forward direction. In the illustrated embodiment, the light direction axis 64 is substantially perpendicular to a plane defined by the front lens 62 and substantially parallel to the ground 22.

The illustrated mounting system 52 is designed to facilitate easy mounting and dismounting of the bike light 50, allow adjustment of the position of the bike light 50 relative to the handlebars 46, and also to facilitate rotational adjustment of the bike light 50 relative to the ground 22. The mounting system 52 includes a mounting bracket 70 adapted to be secured to the handlebars 46, a post 72 adapted to be secured to the mounting bracket 70, and a socket 74 adapted to receive the post 72. The illustrated mounting bracket 70 includes upper and lower clamps 76 that can be secured together using two fasteners 78. Each of the upper and lower clamps 76 includes an inner surface 80 having a wave spline profile and a supporting surface 82 having a semi-cylindrical profile. Upper and lower shims 84 are sandwiched between the upper and lower clamps 76 and the handlebars 46, respectively. The upper and lower shims 84 each have an outer surface 86 with a wave spline profile that substantially matches the wave spline profile of the inner surface 80 of the clamps 76. Each shim further includes a tab 88 adapted to be inserted into an opening 90 in the corresponding clamp. The shims are each made from an elastomeric material to absorb shocks and vibrations and to enhance frictional engagement between the clamps 76 and the handlebars 46, thereby inhibiting undesired rotation between the clamps 76 and the handlebars 46.

The post 72 defines a post axis 92 and includes an engagement portion 94 that is dimensioned to be clamped by the supporting surfaces 82 of the upper and lower clamps 76. The illustrated engagement portion 94 of the post 72 and the supporting surfaces 82 of the upper and lower clamps 76 are substantially smooth, thereby facilitating infinite rotational adjustment of the post 72 relative to the mounting bracket 70. If desired, however, the engagement portion 94 and supporting surfaces 82 can be provided with features (e.g., wavy splines) that provide discrete positions of the post 72 relative to the mounting bracket 70 and inhibit rotation between the post 72 and the mounting bracket 70.

The illustrated socket 74 defines a socket axis 96 and is integrally formed into the housing 54 of the bike light 50. The socket 74 defines a longitudinal orifice 98 dimensioned to snugly receive the post 72. In the illustrated embodiment, the socket 74 can slide longitudinally and rotate relative to the post 72.

A releasable securing mechanism 100 is provided to secure the socket 74 (and therefore the bike light 50) relative to the post 72. The illustrated securing mechanism 100 includes two ball detents 102 positioned in side openings 104 in the post 72, an actuator 106 positioned in a hollow interior 108 of the post 72, and a detent spring 110 for biasing the actuator 106 relative to the post 72. The actuator 106 is movable relative to the post 72 from a secured position (with the actuator 106 being biased out of the post 72 by the detent spring 110) and a released position (with the actuator 106 being pressed into the post 72 by a user). In the secured position, a ramped surface 112 and a securing surface 113 on the actuator 106 forces the ball detents 102 radially outward and into engagement with a pair of first recesses 114 in the socket 74. In this position, the socket 74 (and therefore the bike light 50) is secured against axial and rotational movement relative to the post 72. In the released position, the securing surface 113 moves out of the way to permit the ball detents 102 to move radially inward along the ramped surface 112, toward the post axis 92, and out of the first recesses 114, thereby permitting movement of the socket 74 relative to the post 72.

Figure 9:
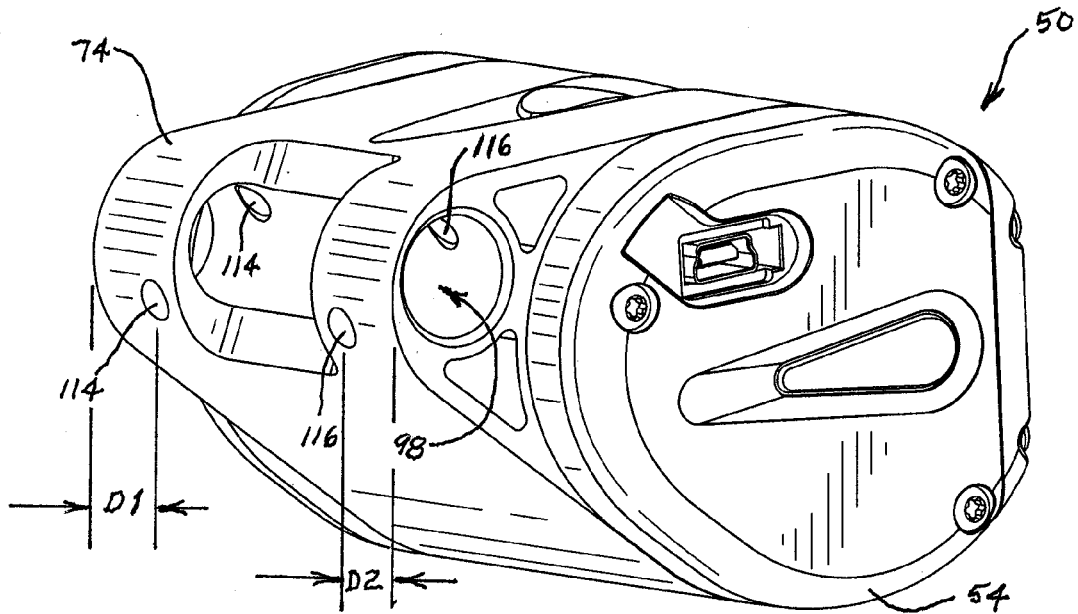
FIG. 9 is a rear perspective view of the light head of FIG. 4.

As shown in FIG. 9, the first recesses 114 are positioned at a distance D1 from one end of the socket 74 so as to be aligned with the position of the ball detents 102. In addition, the socket 74 is provided with a pair of second recesses 116 positioned at a distance D2 from the opposite end of the socket 74. Preferably, the distance D1 is equal to the distance D2. This feature allows the post 72 to be inserted into the socket 74 from either direction, thereby allowing the mounting bracket 70 to be positioned on either side of the handlebar stem 44.

In the event that it is desired to adjust the angular orientation of the bike light 50 relative to the ground 22 surface, the rotational position of the post 72 relative to the mountain bracket can be adjusted. In order to do this, the user loosens the two fasteners 78 of the mounting bracket 70, which will loosen the engagement between the mounting bracket 70 and the post 72. This allows the post 72 to be rotated to the desired position until the bike light 50 is at the desired angular orientation relative to the ground 22 surface. The fasteners 78 are then tightened to secure the post 72 to the mounting bracket 70. Another way of changing the angular orientation of the bike light 50 relative to the ground 22 surface is to rotate the mounting bracket 70 relative to the handlebars 46. This is done by loosening the two fasteners 78 of the mounting bracket 70 and then rotating the mounting bracket 70 relative to the handlebars 46 until the desired angular position of the bike light 50 relative to the ground 22 surface is achieved.

Figure 2:
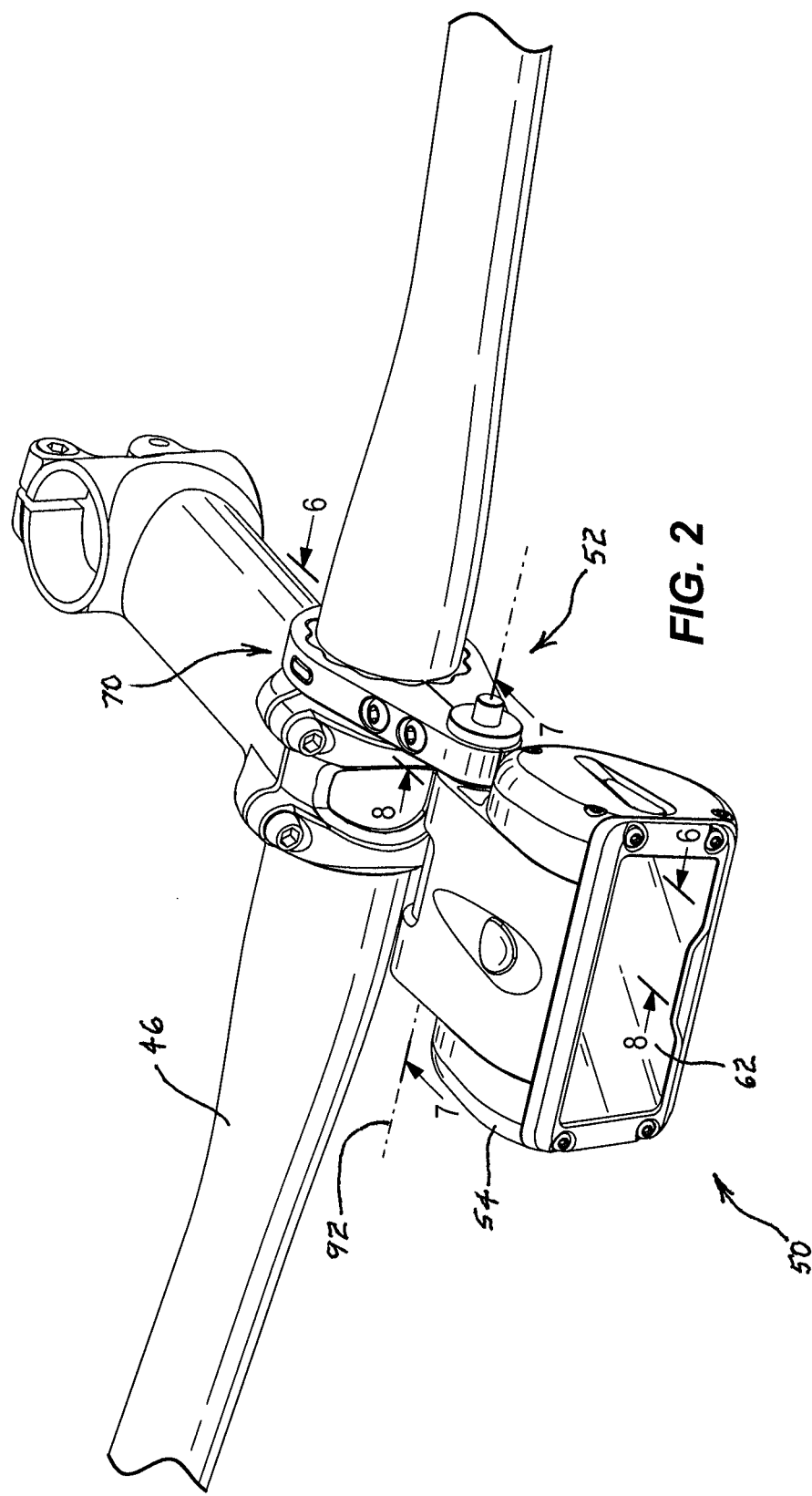
FIG. 2 is a front left perspective view of the lighting system of FIG. 1 including a light head and mounting assembly mounted on a handlebar assembly.
Figure 3:
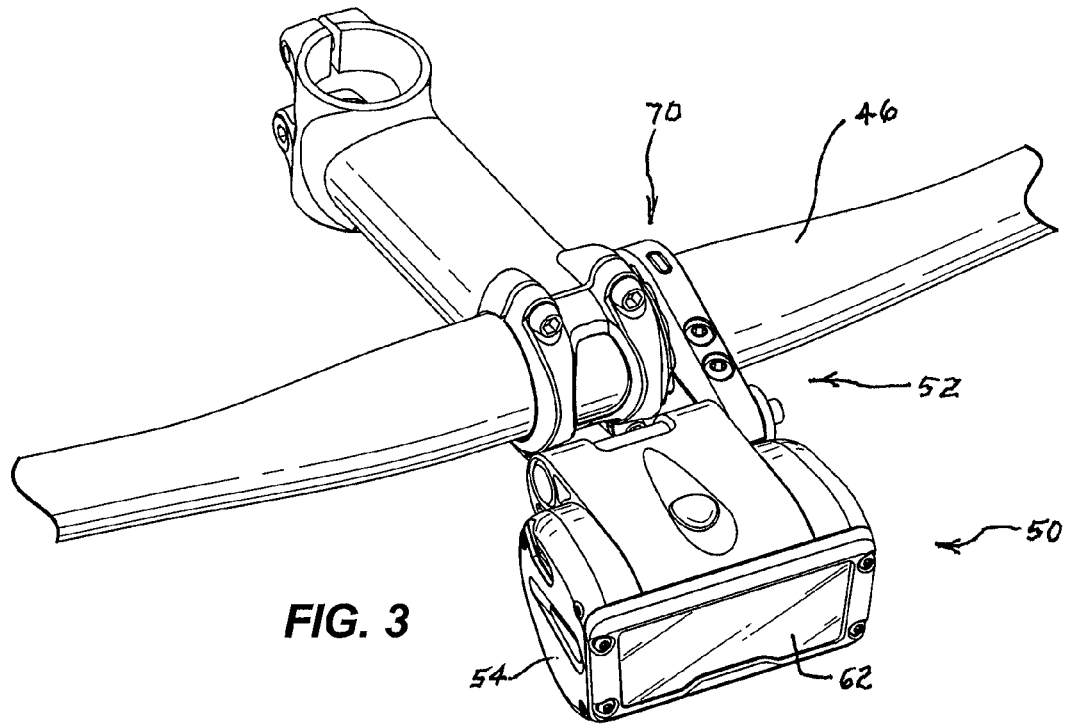
FIG. 3 is a front right perspective view of the lighting system of FIG. 2.
Figure 4:
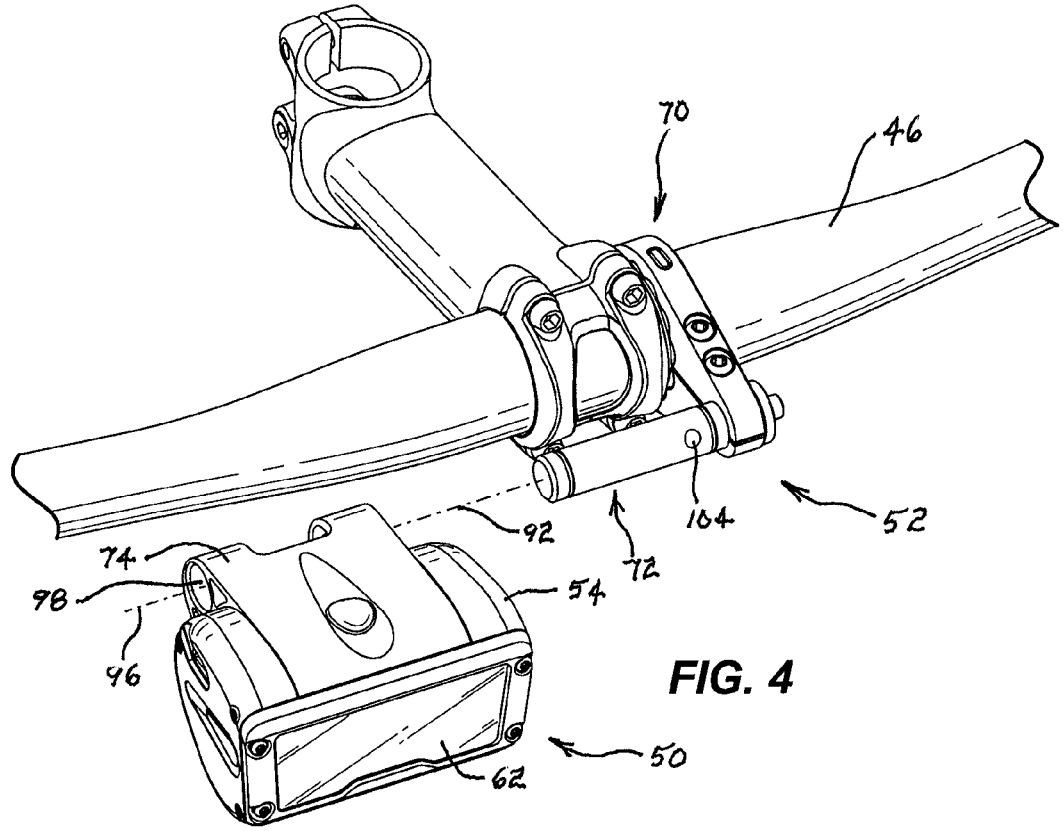
FIG. 4 is the lighting system of FIG. 3 with the light head removed from the mounting assembly.
Figure 5:
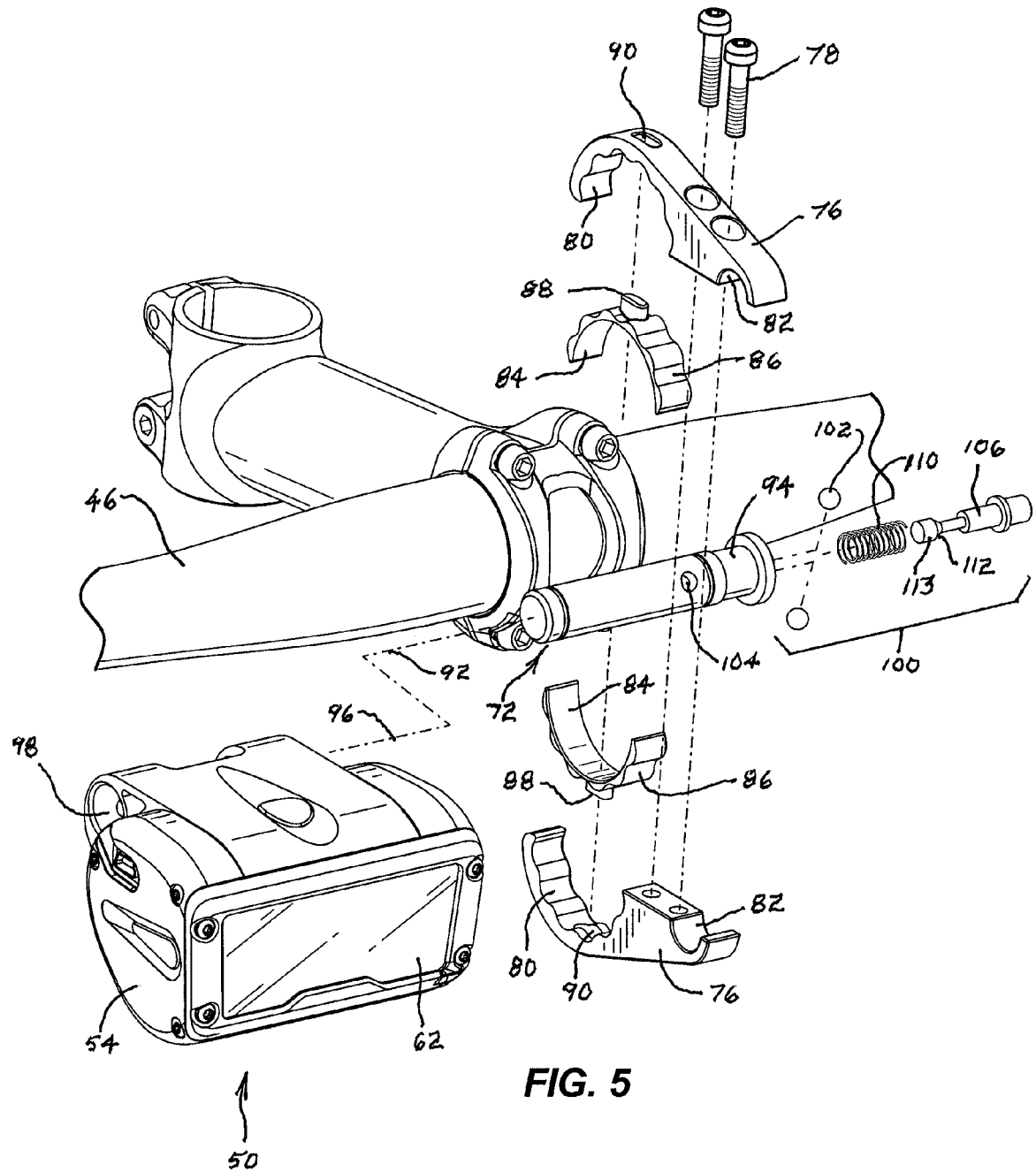
FIG. 5 is an exploded perspective view of the lighting system of FIG. 3.
Figure 6:
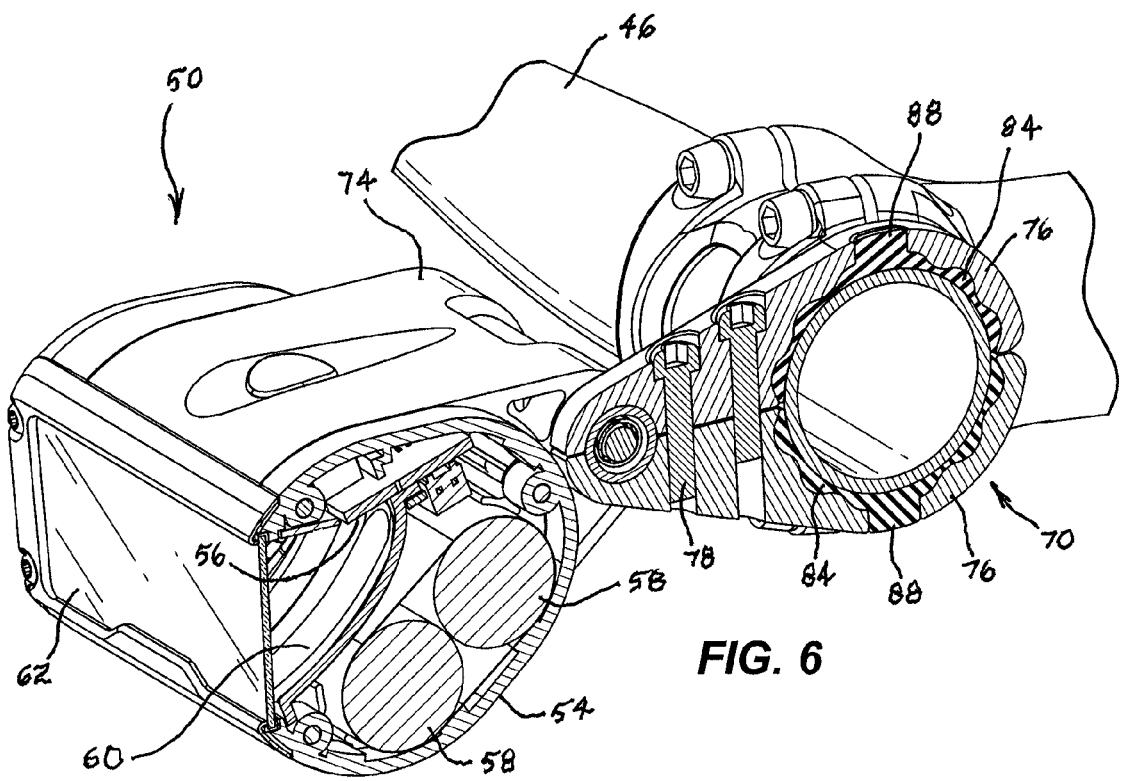
FIG. 6 is a section view taken along line 6-6 of FIG. 2.
Figure 7:
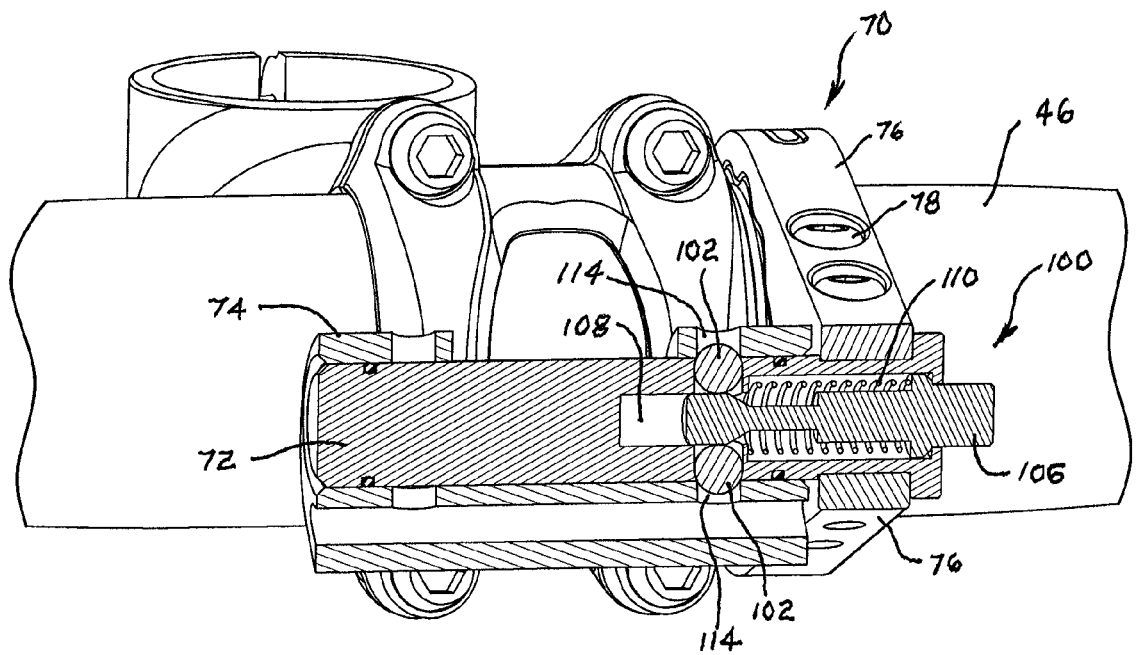
FIG. 7 is a section view taken along line 7-7 of FIG. 2.
Figure 8:
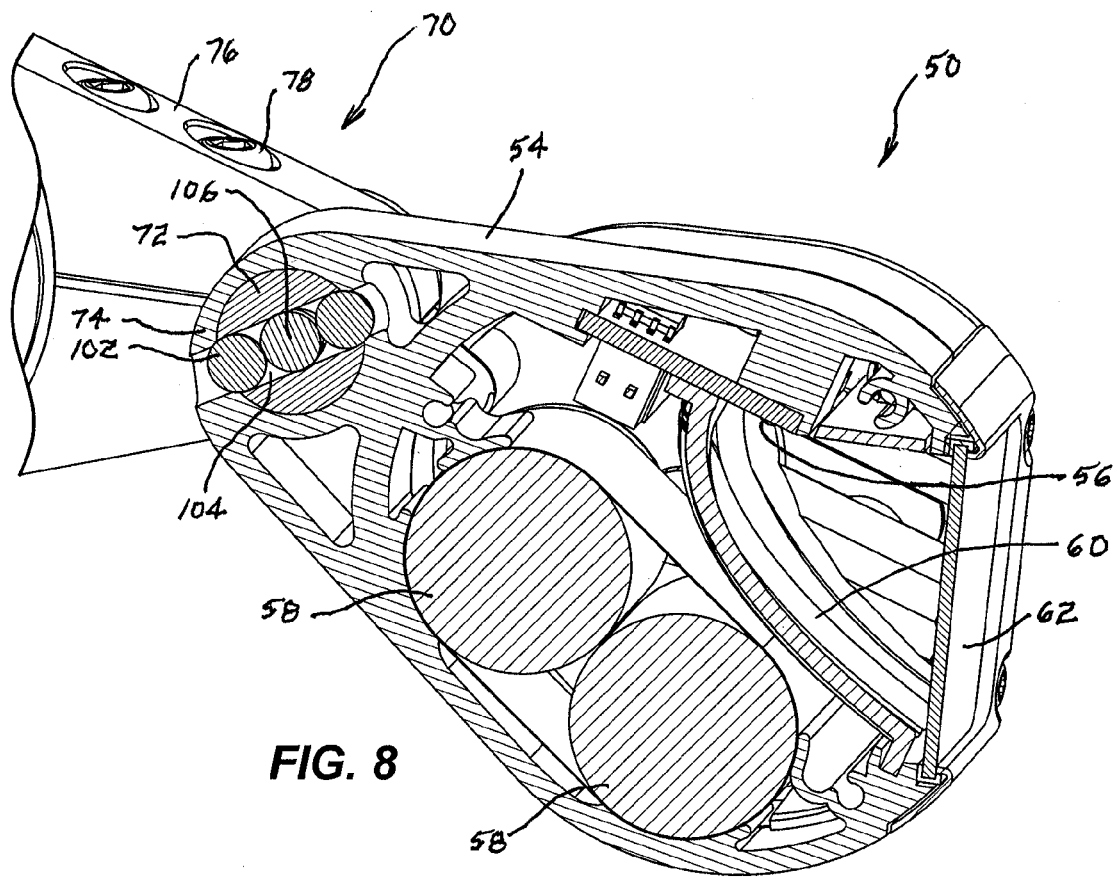
FIG. 8 is a section view taken along line 8-8 of FIG. 2.
Figure 10:
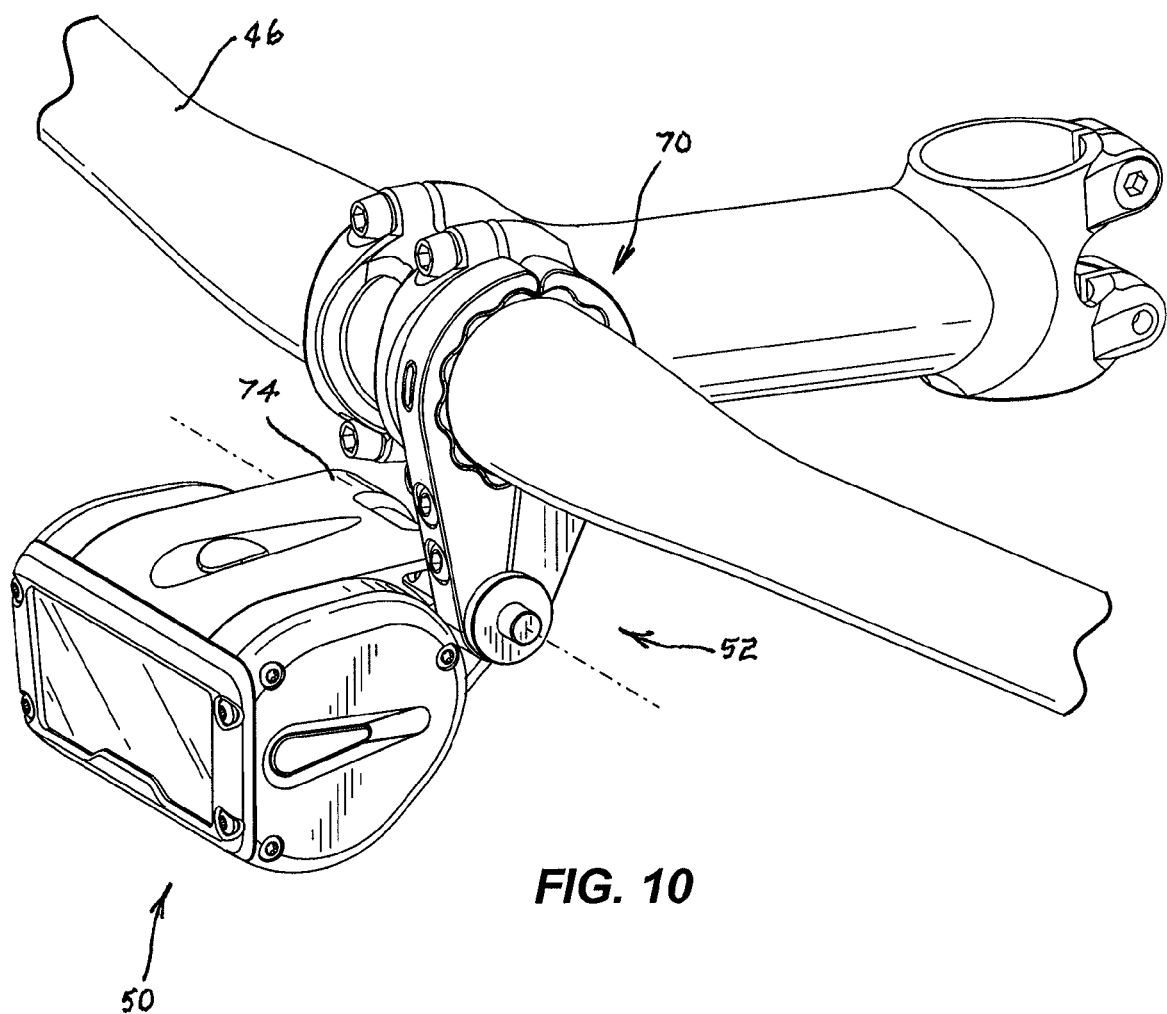
FIG. 10 illustrates an alternative configuration of the lighting system of FIG. 2.

The illustrated mounting system 52 also permits adjustment of the position of the bike light 50 relative to the handlebars 46. For example, the bike light 50 can be positioned directly in front of the handlebars 46 (as shown in FIG. 2), above the handlebars 46, below the handlebars 46 (as illustrated in FIG. 10), or almost any position in between. In order to make this adjustment, the rotational position of the mounting bracket 70 relative to the handlebars 46 is changed to the desired position (as described above), and then the rotational orientation of the post 72 is adjusted (as described above) to achieve the desired angular orientation of the bike light 50 relative to the ground 22 surface.

By virtue of the above-described mounting system 52, the bike light 50 can be quickly and easily attached to and detached from the mounting system 52 by merely sliding the socket 74 onto or off of the post 72 accompanied by manual pressing of the actuator 106. The mounting system 52 further allows the bike light 50 to be positioned directly in front of the handlebar stem 44 and in alignment with the center line of the bicycle 20. In addition, the bike light 50 can be mounted in a variety of different positions relative to the handlebars 46, such as below, in front of, or above the handlebars 46. Further, the angular orientation of the bike light relative to the ground 22 surface can be easily adjusted.

Various features and advantages of the invention are set forth in the following claims.

The invention claimed is:

1. A bicycle and light assembly comprising:
   front and rear wheels;
   a frame support by the front and rear wheels;
   a bike light supported by the frame; and
   a mounting system coupling the bike light to the frame, the mounting system including:
   a socket secured to one of the frame and the bike light, the socket defining a socket axis;
   a post secured to the other of the frame and the bike light, the post being configured to be inserted into the socket along the socket axis; and
   a releasable securing mechanism that secures the post in the socket, the releasable securing mechanism including an actuating member translatable in a direction parallel with the socket axis between a released position and a secured position, wherein the post is hollow defining an interior and includes a side opening in a side wall of the post, and wherein the releasable securing mechanism includes a detent member positioned in the side opening and in engagement with the socket.

2. A bicycle as claimed in claim 1, wherein the socket is secured to the bike light and the post is secured to the frame.

3. A bicycle as claimed in claim 2, wherein the post defines a post axis that is substantially horizontal.

4. A bicycle as claimed in claim 2, wherein the post defines a post axis, wherein the mounting system further includes a mounting bracket coupling the post to the frame, and wherein the mounting bracket facilitates rotational adjustment of the post about the post axis.

5. A bicycle as claimed in claim 1, wherein the post and socket are oriented with the socket axis substantially horizontal.

6. A bicycle as claimed in claim 1, wherein the socket includes a recess that receives the detent member and secures the rotational orientation of the post in the socket.

7. A bicycle as claimed in claim 1, wherein the socket includes two recesses, each being positioned to receive the detent member when the bike light is in one of two discrete rotational orientations relative to the frame.

8. A bicycle comprising:
front and rear wheels;
a frame support by the front and rear wheels;
an accessory supported by the frame; and
a mounting system coupling the accessory to the frame, the mounting system including:
a socket secured to one of the frame and the accessory, the socket defining a socket axis;
a post secured to the other of the frame and the accessory, the post being configured to be inserted into the socket along the socket axis; and
a releasable securing mechanism that secures the post in the socket, the releasable securing mechanism including an actuating member translatable in a direction parallel with the socket axis between a released position and a secured position,
wherein the post is hollow and defines an interior and includes a side opening in a side wall of the post, and wherein the releasable securing mechanism includes a detent member positioned in the side opening and in engagement with the socket.

9. A bicycle as claimed in claim 8, wherein the post defines a post axis, wherein the mounting system further includes a mounting bracket coupling the post to the frame, and wherein the mounting bracket facilitates rotational adjustment of the post about the post axis.

10. A bicycle as claimed in claim 8, wherein the socket includes a recess that receives the detent member and secures the post in the socket.

11. A bicycle as claimed in claim 8, wherein the socket includes two recesses, each being positioned to receive the detent member when the accessory is in one of two discrete rotational orientations relative to the frame.

12. The bicycle and light assembly of claim 1, wherein the light is pivotable relative to the mounting system in the released position and the light is fixed relative to the mounting system in the secured position.

13. The bicycle and accessory of claim 8, wherein the accessory includes a light that is pivotable relative to the mounting system in the released position and the light is fixed relative to the mounting system in the secured position.

* * * * *